(12) United States Patent
Wang et al.

(10) Patent No.: US 11,570,683 B2
(45) Date of Patent: Jan. 31, 2023

(54) MANAGING ELECTRONIC COMMUNICATION WITH AN ACCESS POINT

(71) Applicant: Lenovo (Singapore) Pte. Ltd., New Tech Park (SG)

(72) Inventors: Mengnan Wang, Chapel Hill, NC (US); Howard Locker, Cary, NC (US); Daryl C. Cromer, Raleigh, NC (US); John W. Nicholson, Cary, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 168 days.

(21) Appl. No.: 17/308,185

(22) Filed: May 5, 2021

(65) Prior Publication Data

US 2022/0361079 A1   Nov. 10, 2022

(51) Int. Cl.
| | |
|---|---|
| *H04W 4/00* | (2018.01) |
| *H04W 36/32* | (2009.01) |
| *H04W 36/30* | (2009.01) |
| *H04W 76/30* | (2018.01) |
| *H04W 36/00* | (2009.01) |
| *H04W 52/02* | (2009.01) |

(52) U.S. Cl.
CPC ....... *H04W 36/32* (2013.01); *H04W 36/0069* (2018.08); *H04W 36/30* (2013.01); *H04W 52/0261* (2013.01); *H04W 76/30* (2018.02)

(58) Field of Classification Search
CPC . H04W 36/32; H04W 36/0069; H04W 36/30; H04W 52/0261; H04W 76/30
USPC ......................................................... 370/331
See application file for complete search history.

(56) References Cited

U.S. PATENT DOCUMENTS

| | | | | |
|---|---|---|---|---|
| 8,553,526 | B2 * | 10/2013 | Meylan | H04L 47/822 |
| | | | | 455/452.2 |
| 8,923,898 | B2 * | 12/2014 | Xing | H04W 68/12 |
| | | | | 455/434 |
| 8,971,182 | B2 * | 3/2015 | Lee | H04W 28/0983 |
| | | | | 370/332 |
| 9,001,682 | B2 * | 4/2015 | Kovvali | H04W 48/18 |
| | | | | 370/252 |
| 9,155,032 | B2 * | 10/2015 | Savolainen | H04W 48/18 |
| 9,554,403 | B2 * | 1/2017 | Chou | H04B 7/0632 |
| 9,883,516 | B2 * | 1/2018 | Lee | H04W 8/245 |
| 10,063,546 | B2 * | 8/2018 | Huang | H04W 12/08 |
| 10,349,258 | B2 * | 7/2019 | Ramachandra | |
| | | | | H04W 36/00835 |

(Continued)

*Primary Examiner* — Amancio Gonzalez
(74) *Attorney, Agent, or Firm* — The Small Patent Law Group LLC; Dean D. Small (57) ABSTRACT

A method for communicating in a wireless environment is provided that includes obtaining, with an access point of a first network in the wireless environment, responsiveness data from at least one electronic device. The method also includes communicating with the at least one electronic device to determine availability of a second network in the wireless environment to the electronic device, and determining communication responsiveness through the first network based on the responsiveness data. The method also includes obtaining use data from the at least one electronic device related to the second network, determining communication responsiveness through the second network based on the use data, and disconnecting, with the access point, the at least one electronic device based on the communication responsiveness through the second network.

20 Claims, 4 Drawing Sheets (56) References Cited

U.S. PATENT DOCUMENTS

| | | | | |
|---|---|---|---|---|
| 10,368,383 | B2* | 7/2019 | Jang | H04W 76/16 |
| 10,517,009 | B2* | 12/2019 | Zetterberg | H04W 24/02 |
| 10,567,943 | B2* | 2/2020 | Edge | H04W 76/50 |
| 10,674,521 | B2* | 6/2020 | Hahn | H04W 36/0088 |
| 10,817,555 | B2* | 10/2020 | Chow | G06F 16/24578 |
| 2015/0271226 | A1* | 9/2015 | Luby | H04L 65/612 |
| | | | | 709/231 |
| 2015/0350944 | A1* | 12/2015 | Chen | H04L 43/065 |
| | | | | 370/252 |
| 2016/0087877 | A1* | 3/2016 | Ryu | H04W 76/16 |
| | | | | 370/329 |
| 2020/0280869 | A1* | 9/2020 | Biswas | H04W 4/027 |

\* cited by examiner

MANAGING ELECTRONIC COMMUNICATION WITH AN ACCESS POINT

BACKGROUND

Network access points are devices utilized to form a wireless local area network (WLAN). A WLAN can be provided for wireless coupling to a network, including for an office building, apartment building, shopping center, or the like. The network access points are coupled to a wired router via a cable such as an Ethernet cable, and project a Wi-Fi signal to a local environment for communication through the network. Then through the network, local electronic devices may access the Internet, communicate with remote electronic devices, or the like.

The network access points can function to monitor communication traffic of each of the electronic devices coupled to the access point. The more devices being used, the less bandwidth there is available compared to requests for communication. In particular, as electronic devices such a smart phones, smart watches, Fitbits, etc. are being utilized by individuals, such access points become saturated. In particular, access points that were initially set up to support a designated number of electronic devices in a given office area, must also support the smart phones, smart watches, etc. of individuals within such an area. Such excess communication requests can result in a slowing of communications through individual access points.

One manner in which communication responsiveness can be increased for an electronic device user that is utilizing a WLAN is to have the electronic device monitor and determine if an alternative faster communication path is available. For example, a local cellular connection may result in faster communication responsiveness and access than the WLAN. So, when an electronic device detects that an alternative faster communication pathway is available, the electronic device can automatically change the communication pathway, or alert a user that an alternative faster communication pathway is available.

Though some electronic devices are able to provide such monitoring of communication responsiveness of communication paths, decreasing load on the access point, many electronic devices simply do not have such functionality. Instead, users are simply left with dealing with slow connection responsiveness, unbeknownst to them alternative faster communication pathways are available. Meanwhile, the access point remains overloaded when the potential of another communication path for an electronic device exists that could be used to reduce the load.

SUMMARY

In accordance with embodiments herein, a method for communicating in a wireless environment is provided that includes obtaining, with an access point of a first network in the wireless environment, responsiveness data from at least one electronic device. The method also includes communicating with the at least one electronic device to determine availability of a second network in the wireless environment to the electronic device, and determining communication responsiveness through the first network based on the responsiveness data. The method also includes obtaining use data from the at least one electronic device related to the second network, determining communication responsiveness through the second network based on the use data, and disconnecting, with the access point, the at least one electronic device based on the communication responsiveness through the second network.

In one embodiment the at least one electronic device is a mobile phone, the first network is a Wi-Fi network, and the second network is a cellular network, and the access point disconnects the mobile phone from the Wi-Fi network in the wireless environment. Optionally, the use data includes at least one of data restriction based information, or battery based information. In one aspect, the method also includes disconnecting, with the access point, the at least one electronic device also based on at least one of the data restriction based information, or the battery based information. In another aspect, the first network is a Wi-Fi network, and the second network is a cellular network. In one example, the wireless environment is an office building. In another example, the communication responsiveness through the first network is slower than the communication responsiveness through the second network. In one embodiment, the at least one electronic device is at least one of a personal computer, a laptop computer, or a mobile phone.

In accordance with embodiments herein, a communication system for a wireless environment is provided that includes a first network including an access point, and a second network. The access point includes a memory storing program instructions, and a processor. In response to execution of the program instructions, the processor is configured to obtain responsiveness data from at least one electronic device in the wireless environment, and communicate with the at least one electronic device to determine availability of the second network to the electronic device. The processor is also configured to determine communication responsiveness through the first network based on the responsiveness data, obtain use data from the at least one electronic device related to the second network, and determine communication responsiveness through the second network based on the use data. The processor is also configured to disconnect the at least one electronic device based on the communication responsiveness through the second network.

In one embodiment the at least one electronic device is a mobile phone, the first network is a Wi-Fi network, and the second network is a cellular network, and the access point disconnects the mobile phone from the Wi-Fi network in the wireless environment. Optionally, the use data includes at least one of data restriction based information, or battery based information. In one aspect, the one or more processors are also configured to prevent disconnection from the first network based on the use data after determining the communication responsiveness through the second network. In another aspect, the first network is a Wi-Fi network, and the second network is a cellular network. In one example, the wireless environment is an office building. In another example, the communication responsiveness through the first network is slower than the communication responsiveness through the second network. In one embodiment, the at least one electronic device is at least one of a personal computer, a laptop computer, or a mobile phone.

In accordance with embodiments herein, a computer program product for an access point is provided that includes a non-signal computer readable storage medium comprising computer executable code to obtain responsiveness data from at least one electronic device in the wireless environment. The executable code is also configured to communicate with the at least one electronic device to determine availability of the second network to the electronic device, determine communication responsiveness through the first network based on the responsiveness data, and obtain use data from the at least one electronic device related to the second network. The executable code is also configured to determine communication responsiveness through the second network based on the use data, and disconnect the at least one electronic device from the access point based on the communication responsiveness through the second network.

In one embodiment the at least one electronic device is a mobile phone, the first network is a Wi-Fi network, and the second network is a cellular network, and the computer executable code to disconnect the mobile phone from the Wi-Fi network. Optionally, the computer executable code is also configured to prevent disconnection from the first network based on the use data after determining the communication responsiveness through the second network. In one aspect, the first network is a Wi-Fi network, and the second network is a cellular network. In another aspect, the communication responsiveness through the first network is slower than the communication responsiveness through the second network. Alternatively, the communication responsiveness through the first network is faster than the communication responsiveness through the second network. In one example, the at least one electronic device is at least one of a personal computer, a laptop computer, or a mobile phone.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

A communication system and method are provided herein where an access point of a first network makes determinations related to disconnecting electronic devices from the access point in favor of an available second network. The access point gathers responsiveness data related to the electronic devices utilizing the access point to determine the communication responsiveness through the first network. The access point also communicates with the electronic devices to determine which electronic devices have access to the second network, and the communication responsiveness through the second network. Then, if the communication responsiveness through the second network is close to, or faster than through the first network, the access point further communicates with individual electronic devices for use data, including data restrictions, battery restrictions, or the like that may inconvenience the user if disconnected from the first network. Then, based on the use data, the access point disconnects electronic device(s) to provide a faster responsiveness and greater experience for all of the users of the communication system.

The term "network", as used throughout shall mean two or more electronic devices that communicate with one another. The communication can be wire based, or wireless. Wireless networks include wireless local area networks (WLANs) such as Wi-Fi based networks (Wi-Fi network), cellular networks, or the like. Other networks can also include local area networks (LANs), public networks, private networks, wide area networks, etc. Networks may utilize a common communication protocol that governs the communication between the electronic devices.

The term "access point", as used throughout, shall include hardware and software through which wireless communications that are governed by wireless protocols are passed through. The wireless protocols may include protocols based on the Institute of Electrical and Electronics Engineers (IEEE) 802.11 protocol and utilized for a WLAN, including an IEEE 802.11 compatible security algorithm, such as, for example, Wi-Fi Protected Access (WPA), Wi-Fi Protected Access II (WPA2), or Wired Equivalent Privacy (WEP).

The term "wireless environment", as used throughout, shall mean the surroundings in which electronic devices that share a wireless network are located. The wireless environment may include a local area network, a private or public area network, a wide-area network, a combination thereof, or otherwise. Wireless environments can include office buildings, apartment buildings, shopping malls, or the like.

The term "electronic device", as used throughout, shall include (but not be limited to) portable devices, sensors, Fitbit device, smart phone, smart watch, and computing devices. The computing device can be a laptop computer, tablet computer, netbook computer, personal computer (PC), a desktop computer, a personal digital assistant (PDA), a smart phone, or any programmable electronic device capable of wirelessly communicating with gateway, and supporting the desired functionality, home appliance, such as a thermostat, television, stereo, stove, refrigerator.

The terms "responsiveness" and "responsiveness data" refer to one or more characteristics associated with a browser session. Non-limiting examples of responsiveness characteristics include network bandwidth, load times, connection speeds, network speeds, load speeds, an amount of traffic experienced on a network, an amount of traffic experienced by a particular network resource, a load experienced by networking equipment supporting the particular network path and the like. A responsiveness of a browser session may vary based on numerous characteristics. Also, responsiveness may include information characterizing a load experienced by a resource manager and/or client device. Non-limiting examples of responsiveness data include an amount/level of memory utilization, an amount/level of CPU activity, an amount/level of hard drive utilization, an amount/level of background operations performed by the CPU (e.g., performing an anti-virus scan), a nature of background operations performed by the CPU, etc. Additionally or alternatively, the responsiveness information may include network load experienced by the electronic device.

The term "user data", as used throughout, shall include all information and data related to communication of an electronic device with and/or through another network. User data can include electronic device model, communication bandwidth, communication, website information, webpage information, website content, application information, etc. In particular, in example embodiments when an access point communicates with an electronic device, the user data is related to potential or desired communication through a network that does not include the access point. Such data and information includes availability of such a network for the electronic device to access.

Figure 1:
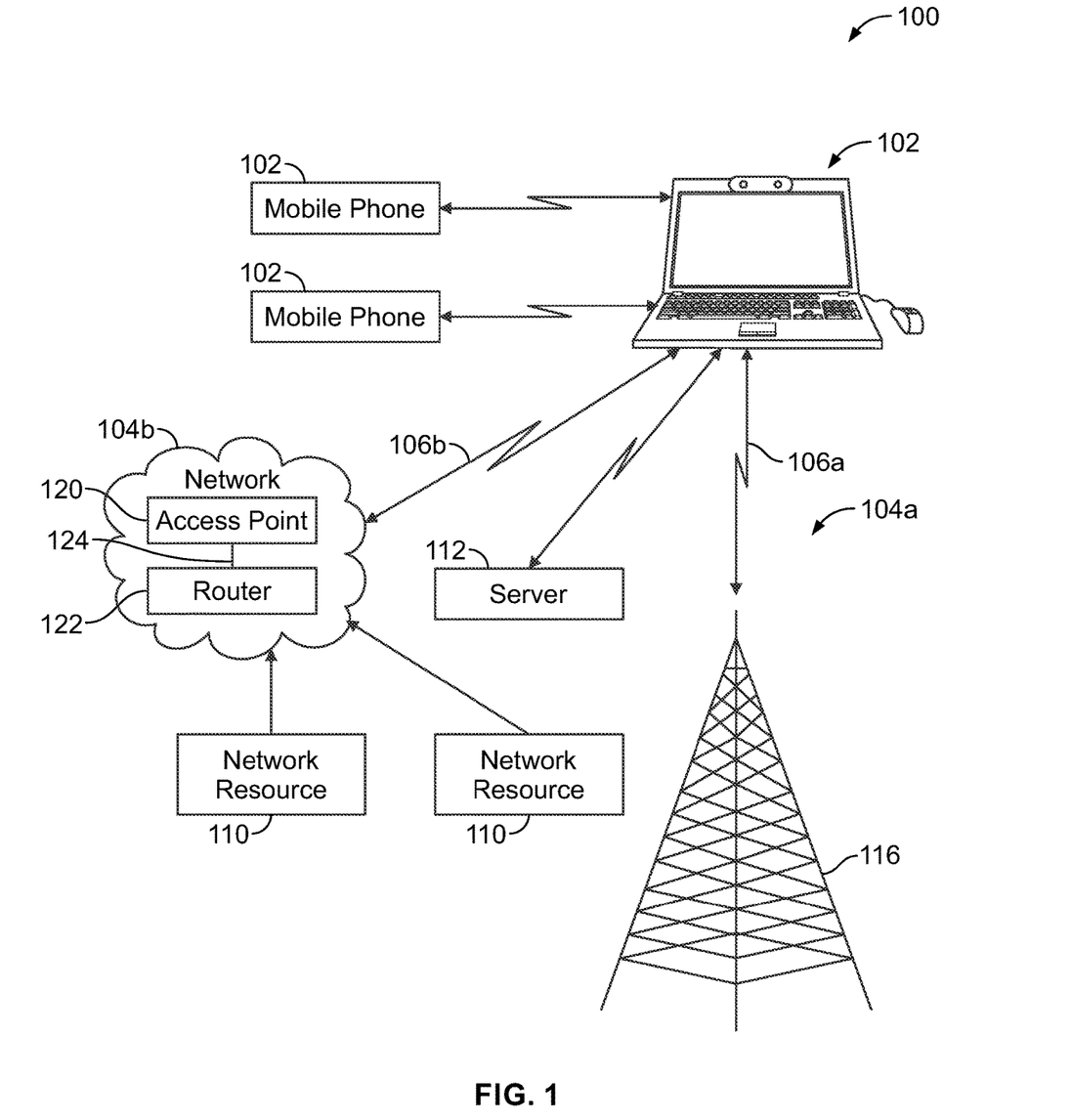
FIG. 1 is a functional block diagram illustrating a communication system in a wireless environment, in accordance with an embodiment herein.

FIG. 1 is a functional block diagram illustrating a communication system 100 in a wireless environment 101, in accordance with an embodiment. In example embodiments the wireless environment 101 can include an office building, a company, a residential or apartment building, a shopping center, or the like.

In an embodiment, the communication system 100 also includes one or more electronic devices 102 that are within the wireless environment. The electronic devices 102 can be personal computers, laptop computers, smart phones, smart watches, PDAs, Fit Bits, or the like. In one example, the electronic devices 102 include personal computers, smart phones, smart watches, and Fit Bits within the wireless environment of an office building. In this manner, some of the electronic devices are non-transitory, or do not move in and out of the wireless environment on a day to day basis, while other electronic devices 102 are transitory, moving in and out of the wireless environment. Similarly, at any given time, an electronic device 102 can be operating in an on-state, operating in a low battery state, or in an off-state. In the low battery state, the electronic device may present a screen saver, request a password or other form of identification before entering the on-state, or the like to save battery use.

When in an operating state, each electronic device 102 can operate to couple to two or more networks 104a, 104b that each provide a communication pathway 106a, 106b to access the Internet, remote network devices 110, remote servers 112, and the like. The two or more networks 104a, 104b can be, for example, a local area network (LAN), a wireless local area network (WLAN), or a combination of the two, and can include wired, wireless, or fiber optic connections.

In one example, the first network 104a is a cellular network that provides for the first communication pathway 106a. In the cellular network, the last link of the communication is wireless. In particular, the first communication pathway 106a may utilize a cell tower, or base tower 116, other cells, etc. when communicating with the Internet 108, remote network devices 110, remote servers 112, or the like.

Meanwhile, the second network 104b can be a Wi-Fi based network, or Wi-Fi network, that provides the second communication pathway 106b. The Wi-Fi network utilizes wireless protocols based on the Institute of Electrical and Electronics Engineers (IEEE) 802.11 protocol and utilized for a LAN. To this end, the electronic device 102 connects to the WLAN in accordance to an IEEE 802.11 compatible security algorithm, such as, for example, Wi-Fi Protected Access (WPA), Wi-Fi Protected Access II (WPA2), or Wired Equivalent Privacy (WEP).

In an example, the Wi-Fi network includes one or more access points 120 that communicate with the electronic device 102 and are coupled to a wireless router 122 via a cable 124 that in one example is an Ethernet cable. The wireless router 122 operates to provide wireless routing connectivity for wireless devices connected to the access point 120. For example, messages between the electronic device 102 and remote network devices 110 directly connected to the access point 120 can be routed directly by the wireless router 122. The access point 120 in one example also includes a network port that can be a hardware or software end point of communications at the access point 120. Network ports can identify specific processes and/or types of network services. A network port is associated with an Internet protocol (IP) address of an access point 120 and the protocol type of the communication, and completes the destination or origination address of a communication session. In all, regardless of whether a cellular network 104a or Wi-Fi network 104b is utilized to access the Internet 108, remote network devices 110, and remote servers 112, information, data, and the like may be communicated to and from the electronic device 102 to and from the remote network devices 110 or remote servers 112, accordingly.

The remote network devices 110 can include personal computers, laptop computers, smart phones, smart watches, PDAs, Fit Bits, or the like. As used herein, the term remote only refers to an electronic device that is not physically coupled to the electronic device 102 through a wire, cable, or the like to provide a communication path. For example, when the wireless environment is an office building, a first user may be sitting at a conference table with a first electronic device that is a laptop computer, and may be sitting next to a second user with a second electronic device that is also a laptop computer. If the first electronic device and second electronic device are not coupled with a cable to provide a communication path, and can communicate with one another, the second electronic device is considered a remote network device 110 to the first electronic device that is considered the electronic device 102. This is the case, even if the first electronic device and second electronic device were physically touching, or stacked on top of one another. In order to communicate with one another, the first electronic device can communicate an electronic mail (email), text message, Instagram, communication through an Internet chat, etc. In addition, even if the first electronic device, and second electronic device are coupled with a physical cable, if the communication pathway does not include the physical connection, the first and second electronic devices are considered remote to one another.

A remote server 112 includes any device that can store information. A remote server can include hardware, or software, as long as information is stored by the user. A remote server 112 may be in communication with only one electronic device, or numerous electronic devices. In one example, to access a remote server a security protocol must be provided such as a password, identification through a biometric sensor, third party access, or the like.

Figure 2:
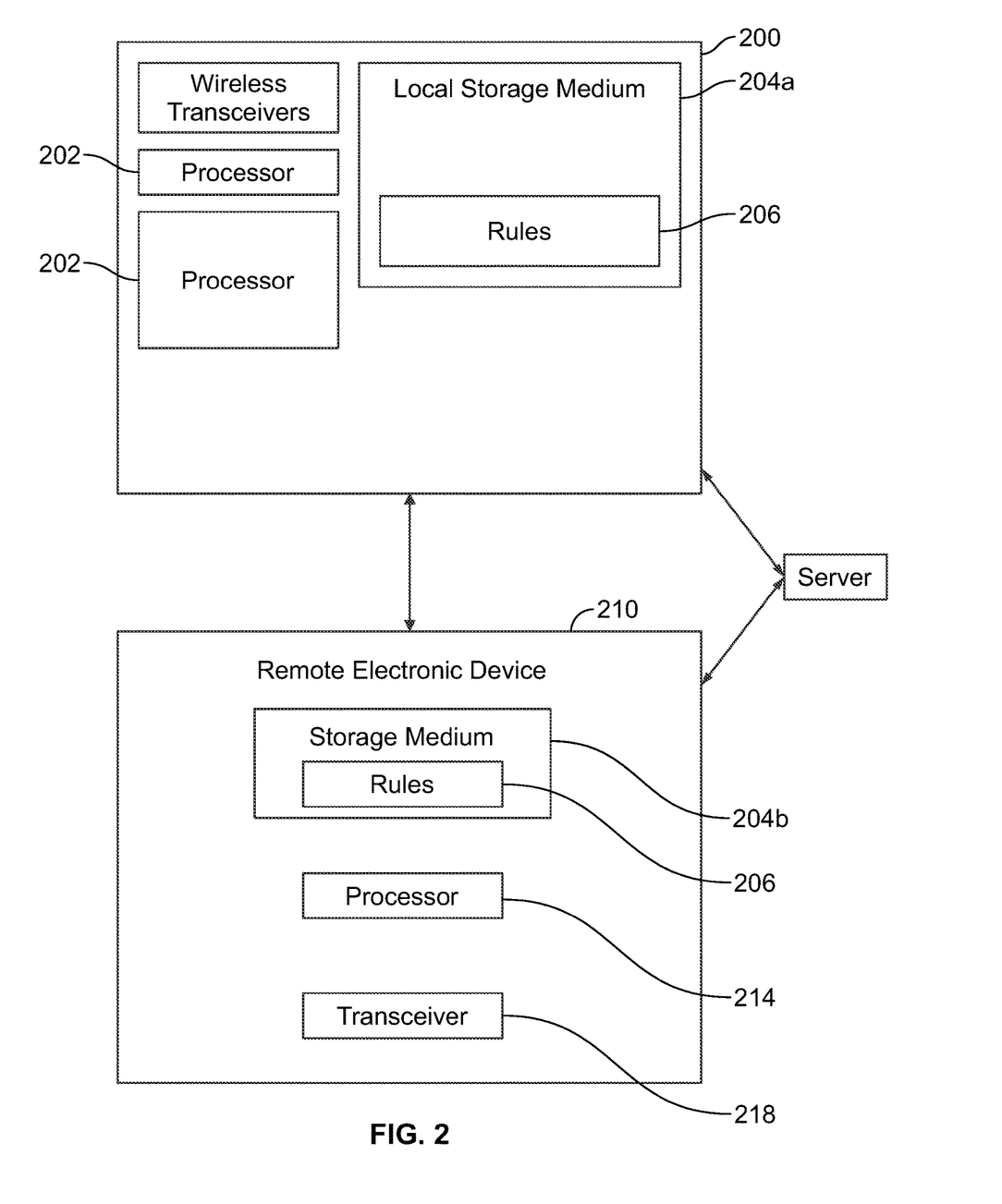
FIG. 2 illustrates a schematic block diagram of an access point in a wireless environment, in accordance with an embodiment herein.

FIG. 2 provides a schematic diagram of an access point 200 utilized within a Wi-Fi network. In one example, the access point 200 is the access point 120 of Wi-Fi network 104b of FIG. 1. The access point 200 can include one or more processors 202, and have access to a memory 204a, 204b that stores information. The memory 204a, 204b can be an access point memory 204a, or at a remote electronic device memory 204b that is in communication with the one or more processors 202 of the access point 200. The memory 204a, 204b may include a set of rules 206 that define access settings, security settings, communication pathway settings, or the like that define the operation of the access point 200. Such set of rules 206 may include password information, communication priority protocol, or the like for governing the operation of the access point 200.

The access point 200 in one example includes one or more network ports 208 that are configured to receive a cable, such as an Ethernet cable to communicatively couple the access point 200 to a router. The access point 200 can also establish a wireless channel to an electronic device 210. In one example, the electronic device 210 is the electronic device 102 of FIG. 1. The electronic device 210 can be a computing device, such as a laptop or desktop computer, with ad hoc wireless network capability. When the access point 200 and electronic device 210 are within a wireless range of each other, and a wireless channel 212 has been established between them.

The electronic device 210 may include one or more processors 214, a memory 204b, transceiver 218, or the like. The electronic device 210 can also be coupled to a server 220. In particular, the electronic device 210 and access point 200 may communicate, such that the one or more processors 202 of the access point 200 may request information from the electronic device 210. Such information can include availability of networks to the electronic device, device settings, device battery life, data plan information, or the like. In particular, by obtaining information related to the access the electronic device 210 has to other networks, a determination can be made regarding whether to disconnect the electronic device 210 from the access point 200 to have the electronic device 210 access a different network.

For example, the access point 200 can determine, based on the number of electronic devices 210, and the bandwidth required by each device, the relative bandwidth and communication responsiveness available through a network having the access point 200. As used herein, communication responsiveness can include communication rates and be based on the amount of information or data as measured in bytes that can be communicated during a determined period, such as seconds, minutes, hours, or the like. To this end, the communication responsiveness of a network can be a measurement of responsiveness at a single point of the network, such as an access point, or can be the average responsiveness from a starting point at a first electronic device to an ending point as a second electronic device. The access point 200 can communicate a connection information request to the electronic device 210 to share information related to connection methods, communication responsiveness test results, electronic device limitation such as battery data and information, willingness to be disconnected, or the like. In one example, a protocol is provided such that each electronic device 210 automatically shares such information and data with the access point. Then based on the information, the access point may execute a disconnection to the access point 200.

In other embodiments, addition information can be requested and shared between the access point 200 and an electronic device 210. Such information may include programs being operated by the electronic device 210 utilizing the access point 200, Internet webpage addresses, identification of user of the electronic device, or the like. In particular, additional details may be gathered by the one or more processors 202 related to the use and user of the electronic device in making determinations, setting priorities, or the like. For example, if an electronic device 210 is only using the access point 200 to access the Internet to search a sports, news, or leisure based website, and an alternative network is available, the one or more processors may be more likely to disconnect the electronic device 210 from the access point 200.

In another example, if a wireless environment is an office building and a first electronic device is identified as being utilized by the chief executive officer, and another device is being operated by a guest, or unknown user, the guest or unknown user may be more likely to be disconnected from the access point. In yet another example, the type of electronic device may be the information or data provided. Again, in a wireless environment of an office building, certain electronic devices such as Fit Bits, smart watches, gaming devices, or the like can be more likely to be disconnected by the access point 200 than a personal computer, laptop computer, PDA, smartphone, or the like.

In particular, the one or more processors may include an algorithm, artificial intelligence algorithm, mathematical model, mathematical function, or the like to utilize the responsiveness data and information provided by each electronic device 210 accessing the access point 200, and use data obtained by the access point 200 as variables to determine when to disconnect an electronic device. In this manner, an individual who is disconnected from the access point will have another manner to access a network, while also not inconveniencing or frustrating the user as a result of the disconnection. In opposite, typically, the disconnection will result in a faster and better communication pathway, enhancing the experience of the user in the wireless environment. In addition, by disconnecting electronic devices 210 that have alternative networks through which they may access the Internet, remote electronic devices, remote servers, and the like, more bandwidth and greater communication responsiveness through the network is obtained for the remaining electronic devices utilizing the access point 200.

Figure 3:
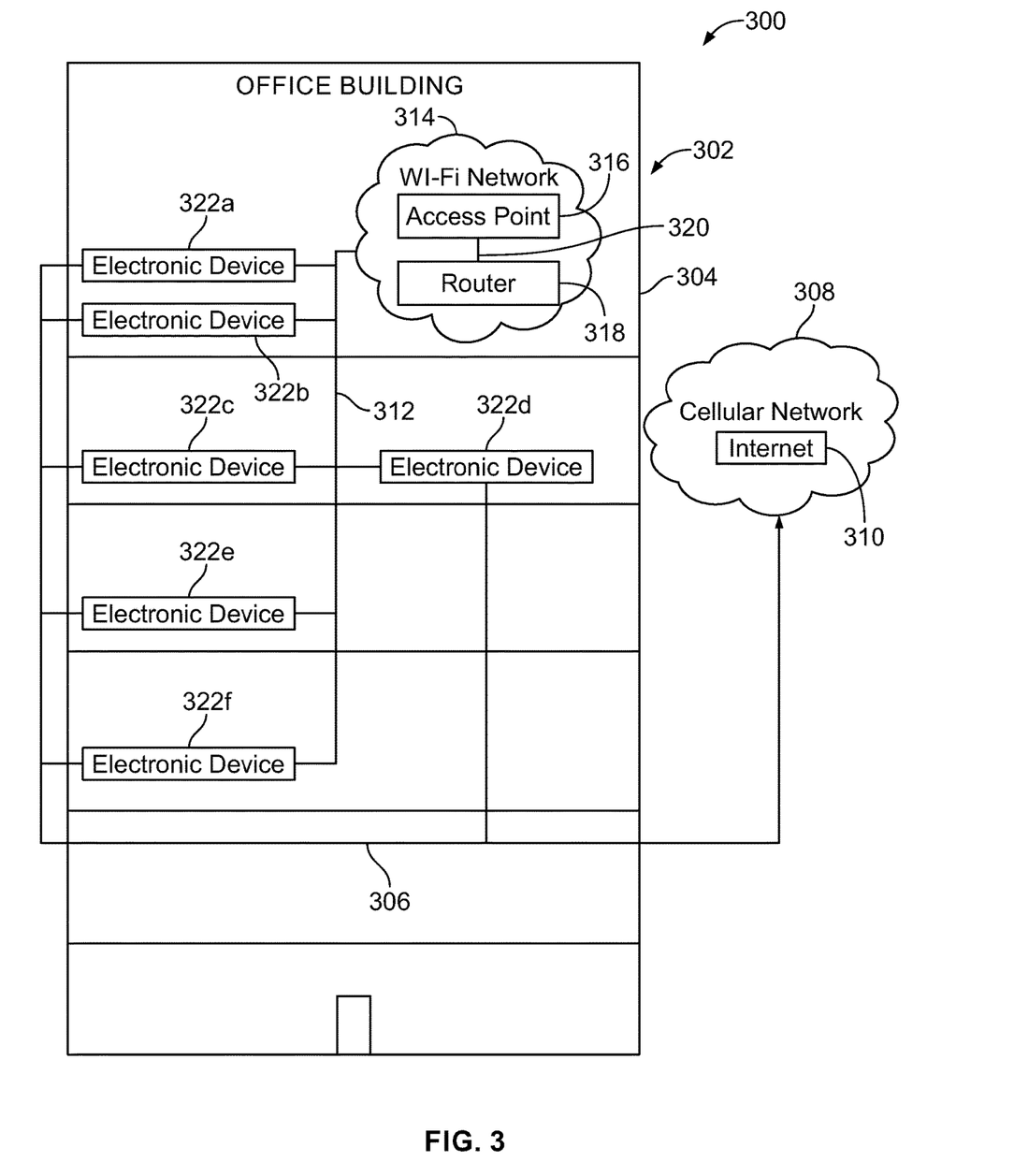
FIG. 3 illustrates a schematic block diagram of a communication system in a wireless environment, in accordance with an embodiment herein.

FIG. 3 illustrates a communication system 300 for a wireless environment 302 that is an office building 304. In the wireless environment 302 a first communication pathway 306 is provided via a cellular network 308 to provide wireless access the Internet 310. While the cellular network 308 may be utilized to also access remote electronic devices, remote servers, or the like as described above, for illustration purposes, only the Internet is illustrated. In particular, the communication pathway results in a communication responsiveness through the cellular network 308, a first amount of battery usage over a period of time, and a first amount of data usage over a period of time. Such communication responsiveness through the cellular network 308, first amount of battery usage over a period of time, and first amount of data usage may vary based on the location of the electronic device, availability of cells or base towers, distance away from cells or base towers, application(s) in use on the electronic device, number of electronic devices accessing the first communication pathway, amount of bandwidth occupied by electronic devices utilizing the first communication pathway, or the like.

Also within the wireless environment 302 is a second communication pathway 312 provided via a Wi-Fi network 314 to also provide access to the Internet (not shown in Wi-Fi network 314 for convenience purposes). The Wi-Fi network 314 can include an access point 316 that can be coupled to a router 318 via a cable 320, such as an Ethernet cable. Similar to the first communication pathway, the second communication pathway 312 has a communication responsiveness through the Wi-Fi network, a second amount of battery usage over a period of time, and a second amount of data usage over a period of time. Similar to the first communication pathway, the communication responsiveness through the Wi-Fi network, second amount of battery usage over a period of time, and second amount of data usage may vary based on the location of the electronic device, availability of auxiliary access points, distance away from the access point, application(s) in use on the electronic device, number of electronic devices accessing the second communication pathway, amount of bandwidth occupied by electronic devices utilizing the second communication pathway, or the like.

Each of the cellular network 308 and Wi-Fi network 314 present wireless communication pathways that may be utilized by plural electronic devices 322A-F within the office based wireless environment 302. In the illustrated example embodiment of FIG. 3, electronic devices 322A, C, and E represent computers utilized by employees at the office building. Meanwhile, electronic device 322D represents a smart phone of an employee using the electronic device 322C, electronic device 322B represents a Fit Bit worn by the employee utilizing electronic device 322A, and electronic device 322F represents a laptop computer of a guest in a conference room.

In the example embodiment, the electronic devices 322A-322E all automatically access to the Wi-Fi network 314 upon each employee entering the wireless environment. In order to access the Wi-Fi network 314 a security parameter, such as a password, must be provided. To this end, the guest with electronic device 322F must receive such a Wi-Fi password in order to access the Wi-Fi network 314, and therefore electronic device 322F does not automatically access the Wi-Fi network 314.

In the example embodiment, electronic devices 322A-322E have already accessed and are using the Wi-Fi network 314, and the guest enters the Wi-Fi password to gain access to the Wi-Fi network. Upon gaining access to the Wi-Fi network 314 via the access point 316, the access point 316 is configured to determine the load, or bandwidth, being consumed by the electronic devices 322A-322F, and the resulting communication responsiveness of the Wi-Fi network 314 via the second communication pathway 312. The access point 316 is configured to then communicate with each electronic device 322A-322F to determine if any of the electronic devices 322A-322F have an alternative communication pathway, such as the first communication pathway 306 via the cellular network. Based on this determination, the access point 316 may determine that electronic devices 322A, and 322C-322F have access to the first communication pathway 306. The access point can then communicate with those electronic devices 322A, and 322C-322F to determine if any of the devices have use restrictions, such as battery based information, data restricted based information, or the like. In this example, electronic device 322B that is the Fit Bit communicates a data based restriction, in that the employee user has a data plan associated with the Fit Bit that does not provide unlimited data. Optionally, the access point 316 may also communicate with the electronic devices 322A, and 322C-F to determine additional information related to the type of use, identity of the user, or the like. Based on this information, the access point 316 may then determine to disconnect electronic devices 322A and 322F. Specifically, a determination is made that because of the data usage of electronic device 322A that utilizing the cellular network 308 will result in a faster communication responsiveness than if the electronic device 322A remains on the Wi-Fi network 314. Meanwhile, a determination can be made regarding electronic device 322F that as a guest, or unknown electronic device, the cellular network should be utilized to increase bandwidth and increase the communication responsiveness of the Wi-Fi network 314. In this manner, the access point controls and determines which electronic devices utilize the Wi-Fi network 314 and cellular network 308 improving communication responsiveness, and use of the communication system.

Figure 4:
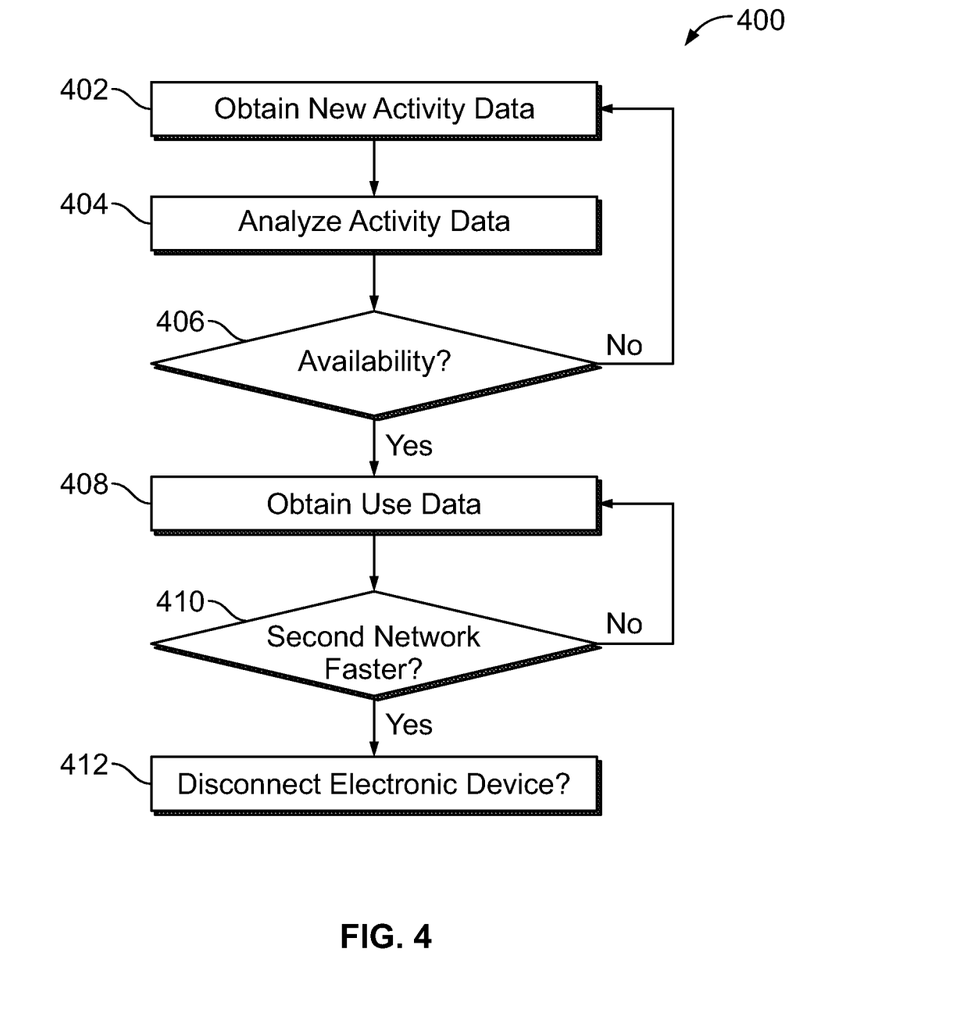
FIG. 4 illustrates a flow block diagram of a process for communicating over various networks within a communication system, in accordance with an embodiment herein.

FIG. 4 illustrates a flow block diagram of a process 400 for communicating over various networks within a communication system. In one example, the communication system of either FIG. 1 or FIG. 3 implements the process of FIG. 4. In particular, any wireless environment that includes more than one communication pathway to one or more networks may utilize the process.

At 402, one or more processors of an access point of a first network obtain new responsiveness data. Specifically, the process is being described in relation to an access point that includes plural electronic devices already using the access point as a first communication pathway of the first network. As such, to obtain the new responsiveness data, in one example, the access point detects a wireless signal, Bluetooth signal, or the like from an individual computing device, phone, or other wireless electronic device. Typically, the signal is received after a password, or other security measure is utilized by the electronic device to gain access to the access point. The responsiveness data may include bandwidth required for the new signal. The access point may record the presence of the signal as the responsiveness data that the user is present and connected to the access point with the bandwidth requirement. Optionally, the responsiveness data may be pushed to the access point and saved in a memory.

At 404, the one or more processors of the access point can analyze the responsiveness data to determine the communication responsiveness of the first network, including the communication path through the access point. The one or more processors determine the bandwidth of all of the electronic devices utilizing the access point and the communication responsiveness at which signals from the electronic devices are being transmitted through the first network.

At 406, the one or more processors at the access point determine if electronic devices connected to the access point have availability to a second communication pathway through a second network. In one example, the second network is a cellular network that provides the second communication path. Availably as used herein refers to the ability of the electronic device to communicate through the second network. For example, when the second network is a cellular network, the number of bars, or availability of a 3G, 4G, 5G, etc. network is determined. If no bars, or no such cellular networks can be accessed, no availability is presented. The one or more processors in one example continuously monitor all electronic devices connected to the access point to determine if a second communication pathway exists for each electronic device. Alternatively, the one or more processors make the determination when the electronic device connects to the access point. In one example, the one or more processors make the determination by sending an inquiry to the electronic devices connected to the access point such that in response the electronic devices provide information and use data related to access to the second network.

If at 406, an electronic device does not have access to a second communication pathway, the one or more processors continue to monitor the electronic device to determine if at any time the electronic device gains access to such second communication pathway. However, if an electronic device never gains access to a second communication pathway, the one or more processors do not disconnect the electronic device.

If at 406, an electronic device does have access to a second communication pathway, then at 408, the one or more processors obtains use data related to the electronic device. The use data can include the bandwidth required to provide a communication signal, data usage plans, restrictions, requirements, etc. of the electronic device, battery usage, or the like. By obtaining the use data from the electronic device, the one or more processors of the access point can make determinations related to whether use of the second communication pathway by the electronic device is beneficial to the user of the electronic device and/or the communication system. For example, if the communication responsiveness through a second network, such as a cellular network, for the electronic device would be faster, or close to as fast using the communication responsiveness through the first network, disconnecting the electronic device may be beneficial to both the user and communication system.

At 410, the one or more processors of the access point determine whether the communication responsiveness through a first network is faster, or near as fast, as the communication responsiveness through a second network based on the use data. In one example, the first network can be a Wi-Fi network that includes the access point, whereas the second network is a cellular network. The one or more processors determine the communication responsiveness through the first network as calculated, measured, or the like based on the other electronic devices accessing the access point. In particular, the bandwidth being utilized at the access point is determinative of the communication responsiveness of the first network. Meanwhile, the use data can include communication responsiveness through a second network, such as a cellular network, or information related to bandwidth, or otherwise that can be utilized to calculate the communication responsiveness through the cellular network. Then the communication responsiveness of each network can be compared to one another. If the communication responsiveness through the cellular network is not faster than the communication responsiveness through the Wi-Fi network, nor within a threshold, such as 95% as fast as the Wi-Fi network, then the one or more processors do not take additional steps, and instead continue to monitor and compare the communication responsiveness of each network.

If at 410 the communication responsiveness through the cellular network is faster than through the Wi-Fi network, or within a threshold, such as 95% as fast as the Wi-Fi network, then at 412, the one or more processors of the access point determine whether to disconnect an electronic device from the access point based on the use data. By utilizing the use data of an individual electronic device along with use data associated with other electronic devices connected to the access point, and determinations related to the communication responsiveness through the first network through the access point compared to a second network, the one or more processors can disconnect an electronic device from the access point. Such disconnection results in use of a second communication pathway.

For example, if a determination is made that a cellular network provides a faster communication responsiveness than the Wi-Fi network, and battery usage over a period of time, and the amount of data usage over an amount of time are not detrimental to the user, the disconnection occurs. In particular, some users may have data use restrictions, have a low battery, have a system setting preventing a switch to a cellular network, or the like that prevents the switching of the communication pathways. In this manner, the communication pathways are only switched when such switching will likely be beneficial to the user, and not a detriment. By switching to the cellular network, not only can a user's communication responsiveness increase, more bandwidth is freed at the access also speeding up the communication pathway for other users of the communication system.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

As will be appreciated by one skilled in the art, various aspects may be embodied as a system, method, or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the figures, which illustrate example methods, devices, and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A method for communicating in a wireless environment, comprising:
    obtaining, with an access point of a first network in the wireless environment, responsiveness data from at least one electronic device;
    communicating with the at least one electronic device to determine availability of a second network in the wireless environment to the electronic device;
    determining communication responsiveness through the first network based on the responsiveness data;
    obtaining use data from the at least one electronic device related to the second network;
    determining communication responsiveness of the second network based on the use data; and
    disconnecting, with the access point, the at least one electronic device based on the communication responsiveness of the second network.

2. The method of claim 1, wherein the at least one electronic device is a mobile phone, the first network is a Wi-Fi network, and the second network is a cellular network, and the access point disconnects the mobile phone from the Wi-Fi network in the wireless environment.

3. The method of claim 1, wherein the use data includes at least one of data restriction based information, or battery based information.

4. The method of claim 3, further comprising:
    disconnecting, with the access point, the at least one electronic device also based on at least one of the data restriction based information, or the battery based information.

5. The method of claim 1, wherein the first network is a Wi-Fi network, and the second network is a cellular network.

6. The method of claim 1, wherein the wireless environment is an office building.

7. The method of claim 1, wherein the communication responsiveness through the first network is slower than the communication responsiveness through the second network.

8. The method of claim 1, wherein the at least one electronic device is at least one of a personal computer, a laptop computer, or a mobile phone.

9. A communication system for a wireless environment, comprising:
- a first network including an access point;
- a second network;
- the access point including:
  - memory storing program instructions; and
  - a processor, in response to execution of the program instructions, configured to:
  - obtain responsiveness data from at least one electronic device in the wireless environment;
  - communicate with the at least one electronic device to determine availability of the second network to the electronic device;
  - determine communication responsiveness through the first network based on the responsiveness data;
  - obtain use data from the at least one electronic device related to the second network;
  - determine communication responsiveness through the second network based on the use data; and
  - disconnect the at least one electronic device based on the communication responsiveness through the second network.

10. The communication system of claim 9, wherein the at least one electronic device is a mobile phone, the first network is a Wi-Fi network, and the second network is a cellular network, and the access point disconnects the mobile phone from the Wi-Fi network in the wireless environment.

11. The communication system of claim 9 wherein the use data includes at least one of data restriction based information, or battery based information.

12. The communication system of claim 9, wherein the one or more processors are further configured to:
- prevent disconnection from the first network based on the use data after determining the communication responsiveness through the second network.

13. The communication system of claim 9, wherein the first network is a Wi-Fi network, and the second network is a cellular network.

14. The communication system of claim 9, wherein the wireless environment is an office building.

15. The communication system of claim 9, wherein the communication responsiveness through the first network is slower than the communication responsiveness through the second network.

16. The communication system of claim 9, wherein the at least one electronic device is at least one of a personal computer, a laptop computer, or a mobile phone.

17. A computer program product for an access point comprising a non-transitory computer readable storage medium comprising computer executable code to: obtain responsiveness data from at least one electronic device in the wireless environment; communicate with the at least one electronic device to determine availability of the second network to the electronic device; determine communication responsiveness through the first network based on the responsiveness data; obtain use data from the at least one electronic device related to the second network; determine communication responsiveness through the second network based on the use data; and disconnect the at least one electronic device from the access point based on the communication responsiveness through the second network.

18. The computer program of claim 17 further comprising computer executable code to:
- prevent disconnection from the first network based on the use data after determining the communication responsiveness through the second network.

19. The computer program of claim 17, wherein the first network is a Wi-Fi network, and the second network is a cellular network.

20. The computer program of claim 17, wherein the at least one electronic device is a mobile phone, the first network is a Wi-Fi network, and the second network is a cellular network, and the computer executable code to disconnect the mobile phone from the Wi-Fi network.

* * * * *